3,247,487
ANALOG STORAGE DEVICE

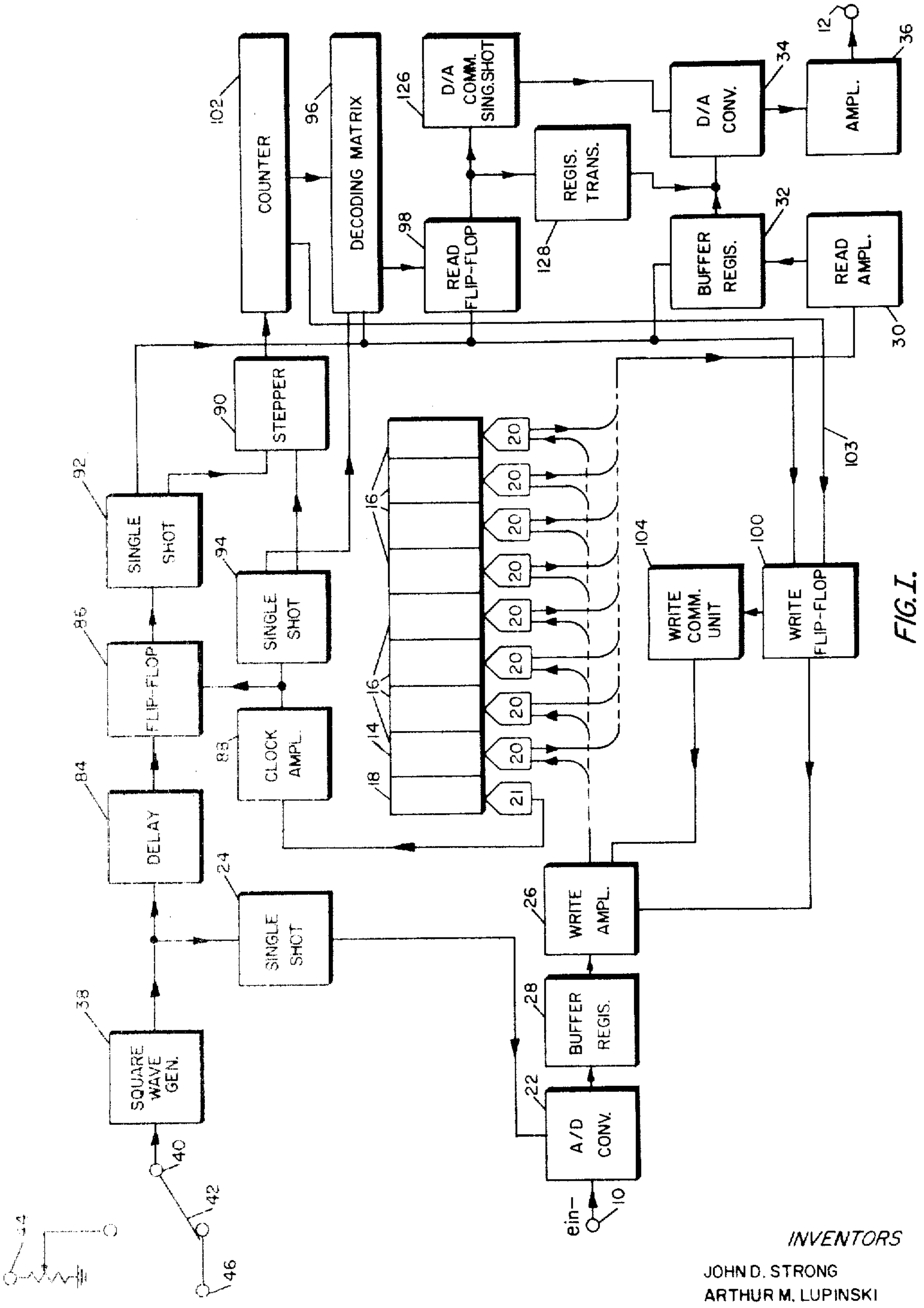
FIG. I.
INVENTORS
JOHN D. STRONG
ARTHUR M. LUPINSKI
BY E. A. Petko
ATTORNEY

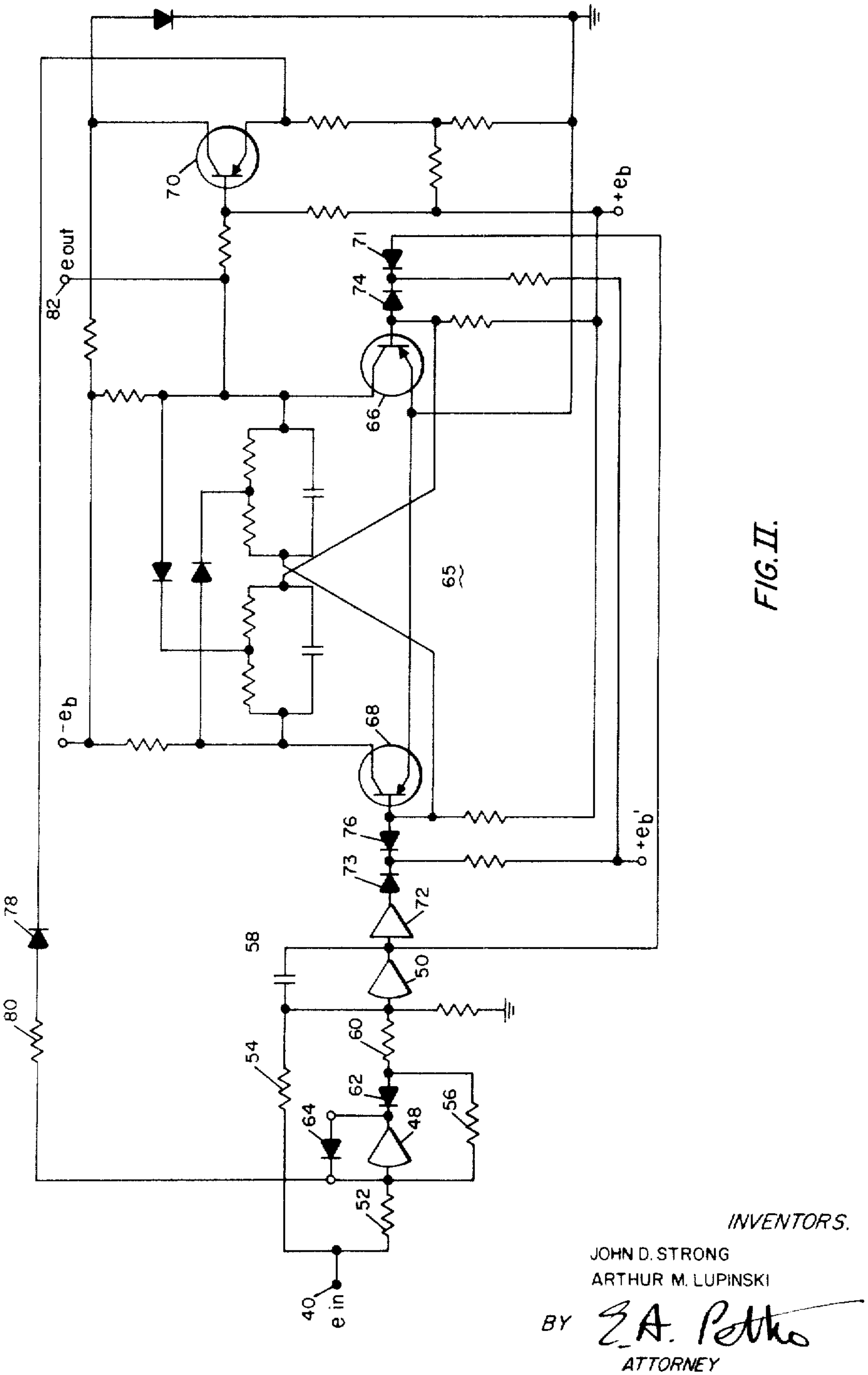
FIG. II.
INVENTORS.
JOHN D. STRONG
ARTHUR M. LUPINSKI
BY E. A. Petko
ATTORNEY

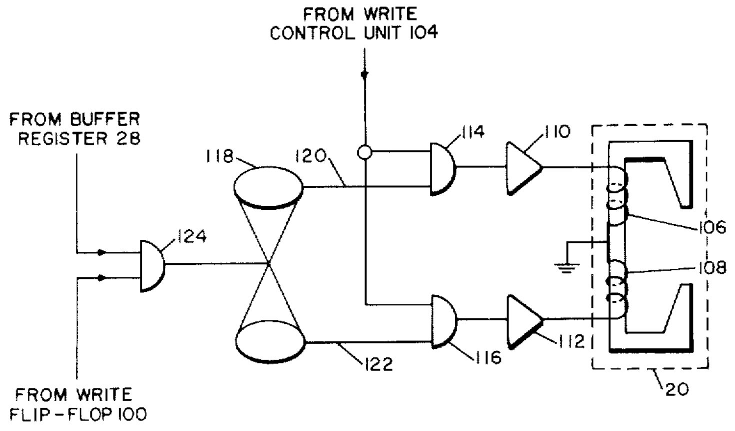
FIG. III.
INVENTORS
JOHN D. STRONG
ARTHUR M. LUPINSKI
BY E. A. Pettis
ATTORNEY

John D. Strong, Holmdel, and Arthur M. Lupinski, Eatontown, N.J., assignors to Electronic Associates Inc., Long Branch, N.J., a corporation of New Jersey Filed Apr. 19, 1960, Ser. No. 23,220
8 Claims. (Cl. 340—172.5)

This invention relates generally to analog information handling systems and more particularly to an analog storage device to be used therein.

Analog computation is generally thought of as a continuous equation solving technique wherein all problem parameters are processed as a whole upon initiation of computer operation. Since all data and parameters for a single solution must be available within the computer at the required instant, prior art analog storage devices have generally taken the form of attenuators, resistors and capacitors. As a result of the cost, access time and storage time limitations imposed on analog computation by these storage devices, analog computer applications have been limited to the class of problems generally characterized by minimum storage requirements, such as may be encountered in the solution of linear and non-linear differential equations.

In recent years it has become necessary to solve a large number of complex problems involving transport delay and partial differential equations which require analog storage capacity of a type and character not available to analog computation prior to the present invention. It is, therefore, an object of the present invention to provide an analog storage device which will be useful in augmenting the usual analog computer operation, and extend the usefulness of analog computers to the solution of problems involving transport delay and partial differential equations.

In its simplest form the present invention is directed to a device which samples at discrete intervals an analog quantity to be delayed, stores the sampled discrete quantities of analog information, and thereafter reads out each discrete analog quantity after a predetermined period of time. In its preferred form the present invention comprises a magnetic drum which is rotatable cyclically at a constant speed and which includes a plurality of information storing channels and a control channel for separately storing signals serially. A read head and a write head are associated with each of the drum channels and are adapted for writing information into the channels and for reading information out of the channels.

The analog quantity to be sampled is coupled to a suitable analog-to-digital converting apparatus which is adapted to produce equivalent digital signals to be applied to the write heads associated with the information storing channels. Suitable digital-to-analog conversion apparatus is similarly coupled to an output circuit and adapted to receive as input signals the information read out of the magnetic drum by the read heads associated with the information storing channels.

The control channel on the magnetic drum may contain a suitable clock track which, via the read head associated with the control channel, is coupled to a read-write controller. A signal generating means adapted for producing a sampling signal at predetermined sampling intervals is also coupled to the read-write controller. The read-write controller is coupled to each of the read and write heads associated with the information storing channels to control independently the drum writing and reading operation.

Through the use of time delay circuits within the read-write controller, each discrete sample of digital information corresponding to the sampled analog quantity is recorded on the drum serially irrespective of the time duration between sampling intervals. Similarly, the information recorded within the drum is read out serially after predetermined suitable time delays.

According to another feature of the present invention, the analog quantity sampling periods are determined by a signal generating means which derives square wave output signals at fixed or variable frequencies in response to an applied analog input signal. The generating means includes an integrator adapted for producing an output signal the frequency of which is proportional to the applied analog input signal. Switching means responsive to the polarity and amplitude of an input signal is coupled to receive the integrator output, and responsive thereto is actuated between controlling postions to produce an output signal of either one polarity or of an opposite polarity. A portion of the output signal from the switching means is fed back to the integrator input to influence the polarity of the analog input signal being applied thereto, and in turn the frequency of the square wave obtained as an output signal from the switching means.

Another object of the present invention is, therefore, to generate an alternating output signal the frequency of which is proportional to the amplitude of an applied analog input.

Still another object of the present invention is to generate an alternating output signal of fixed frequency in response to a fixed amplitude analog input signal, and an alternating signal of variable frequency in response to a variable amplitude analog input signal.

A further object of the present invention is to delay the transmission of an information signal at fixed or variable rates.

Another object of the present invention is to provide a high speed analog storage device which is economical in construction.

Another object of the present invention is to delay the transmission of an information signal through the use of means which do not require meticulous adjustment of mechanical parts.

Still another object of the present invention is to provide an information delay and storage device which is reliable and versatile in operation.

These and other objects, features and advantages will become apparent from the following descriptions taken in connection with the accompanying drawings wherein:

FIG. I is a schematic block diagram of a time delay generator embodying the present invention;

FIG. II is a schematic diagram of a square wave generator according to the present invention; and FIG. III is a logical diagram of a write amplifier according to the present invention.

Referring now to FIG. I, there is shown a preferred embodiment of the present invention having an input terminal 10 and an output terminal 12. The input terminal 10 is coupled to receive an analog input quantity $e_{in}$ which may be variable with time and of the type obtained from the usual analog function generator. The output terminal 12 may be conveniently connected to an input terminal of a usual analog computer wherein the delayed analog quantity may be utilized in a real time problem to be solved.

A serial memory system is employed for delaying the transfer of information from the terminal 10 to the terminal 12 and is shown as a magnetic drum 14 which has a magnetizable surface, and is continuously rotated in one direction at a constant speed. A plurality of parallel channels 16 around the periphery of the drum are employed for serially storing information pulses. The signals to be stored may take the form of a pulse or the absence of a pulse. Each channel 16 is considered to comprise a plurality of cells, each cell corresponding to a discrete length of drum surface, in which the information is to be recorded. Each cell or discrete length of the drum surface may be polarized or magnetized in a first or opposite second direction to indicate the absence of a pulse. A cell polarized in one direction for a portion of its discrete length followed, after an abrupt reversal in polarization at some intermediate point along the discrete length, by polarization in a second or opposite direction for the remainder of its discrete length indicates the presence of a pulse. Conditions of signals occurring at the same time in parallel channels 16 form a code group or information character.

Another channel or clock track 18 on the drum 14 is used as a unitary control channel for storing control signals. The control signals may comprise a clock or timing pulse recorded in each of the plural cell positions along the drum surface. A read head and a write head, shown as unitary read-write head 20, is mounted adjacent to each of the channels 16 and aligned to read or write a line of signals extending along the length of the drum 14. A similar read-write head 21, disposed in alignment with the read-write heads 20, is mounted adjacent to the clock track 18.

The input terminal 10 is connected directly to the input terminal of an analog-to-digital (A/D) converter 22 of any suitable form well known in the art. The A/D converter 22 is adapted to periodically sample the input analog quantity $e_{in}$ in response to commands obtained from a command monostable multivibrator or single-shot 24, in a manner to be described, and convert the analog quantity to an equivalent digital quantity represented by pulses or the absence of pulses, as is well known. The digital output from A/D converter 22 is coupled to a plurality of write amplifier 26, to be hereinafter described, via a suitable buffer register 28. While only one amplifier 26 is shown, it is to be understood that an amplifier is provided for each of the write heads 20 and that the information from the A/D converter 22 is carried to the write heads 20 via a plurality of parallel channels for recordation in the storing channels 16 as an information character.

The read heads 20 are adapted for continuously reading the information recorded within the channels 16, and each read head 20 is respectively coupled to a read amplifier 30 (only one shown). Each amplifier 30 is in turn coupled via a plurality of parallel channels to a suitable buffer register 32. The transfer of information from the register 32 to a suitable digital-to-analog converter (D/A) 34 is under the control of a read control apparatus to be hereinafter described. The digital information character read from channels 16 is converted to an equivalent analog quantity by D/A converter 34 and thereafter amplified and filtered in a suitable amplifier 36 for application to the output terminal 12.

Single-shot 24 is activated from a stable to a quasi-stable state by a square wave generator 38 to initiate the sampling of the input analog quantity $e_{in}$ by the A/D converter 22. In the quasi-stable state of single-shot 24, suitable sampling switch means, not shown, disposed within the A/D converter 22 are enabled to initiate the analog signal sampling operation. The sampling switch means within A/D converter 22 are disabled when single-shot 24 is in its stable state.

Generator 38 is adapted for producing a square wave output of fixed or variable frequency which is applied to the single-shot 24. The input terminal 40 of generator 38 is coupled to a first source of fixed amplitude potential 44, and to a second source of variable amplitude potential 46 through a suitable single-pole double-throw switch 42. The potential 44 is most suitably derived from a conventional direct current power supply while the potential 46 may usually be obtained at the output terminal of a suitable analog function generator, not shown.

Referring now to FIG. II, the input terminal 40 is shown to be coupled to the input terminals of a pair of stabilized direct coupled amplifiers 48, 50 via a pair of resistors 52, 54. Amplifier 48 is provided with a feedback resistor 56 and, in a manner well known in the art, is adapted for imparting a gain of −1 to the input signals obtained at the input terminal 40. Amplifier 50 is provided with a suitable feedback capacitor 58 and operates as a well known integrator adapted for producing an output signal which is directly proportional to the integral of the input potential applied to the input terminal thereof.

In addition to the input obtained via the resistor 54, amplifier 50 has an additional input corresponding to the output signal from amplifier 48, obtained via the resistor 60. The value of resistor 54 is preferably twice that of resistor 60 so that the signal obtained via resistor 60 will have twice the amplitude of the signal obtained via the resistor 54. It is to be noted that a pair of oppositely poled diodes 62, 64 are connected within the feedback loop of amplifier 48, the diode 62 being disposed to conduct only in response to negative output signals obtained at the output terminal of amplifier 48. Diode 64, during non-conduction of the diode 62, will conduct positive signals to the input terminal of amplifier 48 to prevent this amplifier from operating in an open circuited condition.

The output signal from amplifier 50 controls the condition of a suitable bistable multivibrator or flip-flop, indicated generally at 65 and shown to comprise a pair of similar transistors 66, 68 which control a transistor 70, connected as an emitter follower stage. The output signal from amplifier 50 is coupled directly to the anode of a diode 71 and, via a phase inverting amplifier 72, to the anode of a similar diode 73. The cathodes of diodes 71 and 73 are coupled directly to the cathodes of a pair of similar diodes 74, 76, respectively, which have their respective anodes connected to the bases of transistors 66, 68. Diodes 74, 76 operate to gate the potential applied to the bases of transistors 66, 68 and are preferably of the type which conduct in a reverse direction when an applied potential of a proper polarity exceeds a predetermined zener breakdown potential of the diodes.

To complete the circuit of the generator 38, the output signal from the generator, obtained at the emitter of transistor 70, is fed back to the summing junction of amplifier 48 via a series circuit arrangement of a diode 78 and a resistor 80. Resistor 80 is so weighted or proportioned relative to the resistor 52 as to cause saturation of the amplifier 48 upon conduction of the diode 78. It is to be noted that diode 78 conducts responsive only to negative signals. These negative signals are in turn of a proper polarity to cause amplifier 48 to bias diode 62 to a non-conducting condition.

In order to illustrate the operation of the generator 38, let it be assumed that the switch 42 is connected to the potential source 44 and that this source supplies a positive polarity potential of fixed amplitude. Also, let it be assumed that the transistor 68 is in a condition of conduction and that transistor 66 is in a condition of cut-off. In this condition of the transistors, the generator 38 has a negative output at the output terminal 82 and, similarly, the emitter of transistor 70 assumes a negative attitude. The negative signal at the emitter of transistor 70 causes diode 78 to conduct and the negative signal passed thereby causes saturation of the amplifier 48. In this condition of the amplifier 48, a signal is not applied to amplifier 50 via the resistor 60.

The positive input signal from source 44 being applied to the input terminal of amplifier 50 via the resistor 54 will be integrated by the capacitor 58 and appear at the output terminal of amplifier 50 as a negative potential which is increasing in amplitude at a rate determined by the characteristics of the capacitor 58. The integrated output from amplifier 50 is applied to the anodes of diodes 71 and 73 as a negatively increasing and positively increasing potential, respectively. As is apparent, only diode 73 will conduct, and the applied potential, when it exceeds the zener beakdown potential of diode 76, will be applied to the base of transistor 68 and cause this transistor to be biased to a cut-off condition. In turn, transistor 66 will be biased to a condition of saturation or conduction and the output at terminal 82 will assume a positive attitude. Similarly, the emitter of transistor 70 assumes a positive attitude and diode 78 is biased to a non-conducting condition.

When diode 78 becomes non-conductive, the input potential from source 44, as amplified by amplifier 48, will be of a polarity to be passed by the diode 62 to the input terminal of amplifier 50 via the resistor 60. Due to the weighting of the resistors 54 and 60, it becomes apparent that amplifier 50 will now produce a positively increasing output signal which will be applied to the diodes 71 and 73. In this instance the diode 71 will conduct, and when the applied potential becomes sufficiently positive, diode 74 will conduct and the transistor 66 will become cut-off. In the cut-off condition of transistor 66, the output from generator 38, at terminal 82, is negative, the emitter of transistor 70 becomes negative, and diode 78 conducts to cause saturation of amplifier 48.

It is to be noted that the signal output from amplifier 50 is in the form of a recurring sawtooth wave and that the output from generator 38, at terminal 82, is in the form of a square wave, the frequency of recurrence of each wave being determined by the amplitude of the input analog potential obtained from the source 44 and the rate at which this potential is integrated by the capacitor 58. If the switch 42 is closed upon the source 46, since capacitor 58 will integrate an applied signal at the same rate, the duration between individual recurring cycles of flip-flop 65 will vary with time as determined by the rate at which the applied potential varies. So long as the applied potential remains of a fixed amplitude, as from source 44, the frequency of the square wave derived from the generator and the frequency of the sawtooth wave derived from amplifier 50 will remain constant.

The square wave output from generator 38 will hereinafter be referred to as a sampling pulse output or simply as sampling pulses. As was previously stated, the sampling pulses control the operation of the single-shot 24 which initiates and terminates the sampling of the input analog quantity $e_{in}$. In addition to controlling the single-shot 24, the sampling pulses also affect the reading and writing operation of the read-write heads 20 associated with the information storing channels 16. To this end, the square wave generator 38 is shown to be directly coupled to a read-write controller through a delay network 84. Delay network 84 may comprise a single-shot, not shown, adapted for suitably delaying the sampling pulses by a time selected to correspond to the duration of time required by A/D converter 22 to complete digital conversion of a sample of the analog quantity $e_{in}$. The output from delay network 84 is coupled directly to a bistable multivibrator or flip-flop 86, which synchronizes the sampling pulses from generator 38 with the clock pulses read from the clock track 18. The clock pulses read by the read head 21 are applied directly to a suitable clock amplifier, shown at 88, and therefrom to the flip-flop 86.

Flip-flop 86 is maintained in a set condition by the clock pulses; in this condition it does not produce an output. The leading edge of a sampling pulse triggers the flip-flop 86 to a reset condition, wherein it produces an output, and the next subsequent clock pulse triggers the flip-flop to its set condition. The trailing edge of each sampling pulse derived at the output terminal of flip-flop 86 is thus synchronized with the leading edge of a clock pulse; however, the time duration of this pulse output varies in dependence upon the sampling pulse rate and the point in time at which the leading edge of a sampling pulse occurs relative to the leading edge of a clock pulse. In the present embodiment of this invention it is important that the leading edges of the clock and sampling pulses occur in synchronism so that clock pulses may be inhibited in a stepping sequencer 90, in a manner to be described. In order to synchronize the leading edges of the clock and sampling pulses, the pulse output from flip-flop 86 is applied directly to a single-shot 92 to be delayed by a suitable period of time. The clock pulses from read amlifier 88 are similarly applied directly to a single-shot 94 and also delayed by a suitable period of time.

The delayed clock and sampling pulses derived from the single-shots 92, 94 are thereafter utilized to control the read-write heads 20. The single-shot 92 is shown to be directly connected to the stepping sequencer 90, a decoding matrix 96, a read flip-flop 98 and a write flip-flop 100. Single-shot 94 is connected directly to the stepping sequencer 90 and to the decoding matrix 96.

The stepping sequencer 90 may comprise a suitable pulse inhibiting circuit, not shown, which is adapted for continuously applying the pulse output from single-shot 94 directly to a counter 102. The counter 102 may comprise a plurality of binary flip-flops adapted for counting from zero to a number $2^n-1$, where $2^n-1$ corresponds in magnitude to one digit less than the total number of cells or cell positions on the clock track 18 and information storing channels 16. Each count at the counter 102 corresponds respectively to a particular cell or cell position.

When a sampling pulse occurs at the stepping sequencer 90 in synchronism or coincidence with a clock pulse, this particular clock pulse is inhibited and the counter 102 will not advance in count. The next subsequent clock pulse will, however, not be inhibited and consequently the counter 102 will advance in its count. The effect of inhibiting a clock pulse causes the drum 14 to be precessed by one cell position relative to the count at counter 102. Thus, by way of example, if it is assumed that there are 1,000 cell positions (numbered 0–999) about the periphery of the channels 16, 18, the counter 102 must be capable of counting from zero to 999, cell position zero corresponding to the count of zero, cell position 1 corresponding to the count of 1, etc. Absent the occurrence of a sampling pulse, the counter 102 will count from zero to 999 each time that the drum 14 travels through one complete revolution. If a sampling pulse occurs intermediate a drum revolution, the counter will count only from zero to 998 during this particular drum revolution.

For ease of description, the delay imparted to the clock pulses by the single-shot 94 will be ignored, and each clock pulse corresponding to a particular cell position will be considered to occur at the output terminal of a single-shot 94 at the instant that the particular cell position passes beneath the read head 21. Therefore, if a sampling pulse occurs at the stepping sequencer 90 at the instant that a cell position, for example cell position 26, is beneath read head 21, counter 102 will not advance in count. Subsequently, when cell position 27 passes beneath read head 21, the counter will advance to the count of 26. Thereafter, until the occurrence of the next subsequent sampling pulse, the count of zero will correspond to cell position 999, the count of 1 will correspond to cell position zero, etc. The drum cell positions will be similarly further precessed by a count of one relative to the counter count at the occurrence of each subsequent sampling pulse.

In order to enable the writing operation of the write heads 20, the counter 102 is shown to be directly connected to the write flip-flop 100 by a conductor 103. Counter 102 is adapted for producing a pulse output on the conductor 103 each time that it advances to a particular count which, by way of example, may be the count of 999. Thus, each time that the counter 102 advances to the count of 999, a pulse will appear on the conductor 103, and as is apparent, this pulse will be continuously precessed relative to the drum cell position 999 by each occurrence of a sampling pulse.

The delayed sampling pulses occurring at the output terminal of single-shot 92 are also applied directly to the write flip-flop 100. Flip-flop 100 is preferably of a character to produce an output only when it is triggered from a set condition to a reset condition. A delayed sampling pulse from single-shot 92 triggers the write flip-fiop 100 to a reset condition and as ubsequent counter pulse from counter 102 triggers the write flip-flop to its set condition. Write flip-flop 100 is maintained in its set condition by pulses from the counter 102. The pulse output from write flip-flop 100 is applied directly to a write command unit 104, and to the write amplifiers 26. Write command unit 104 instructs the write heads 20 to write and preferably takes the form of a single-shot connected to the write amplifiers 26 and adapted for producing a pulse output of uniform time duration responsive to the output pulses obtained from the write flip-flop 100.

The manner in which an information character is written into the cell positions on the information storing channels 16 is best illustrated by referring to FIG. III, which is a logical diagram illustrating one of the amplifiers 26 connected to a single read head 20. In FIG. III the read head 20 is shown to comprise a pair of similar coils 106, 108 which are connected in series and at their juncture to a point of common potential, such as ground. The free ends of coils 106, 108 are connected respectively to the output terminals of a pair of similar amplifiers 110, 112. The input terminals of amplifiers 110, 112 are connected respectively to the output terminals of a pair of similar "and" circuits 114, 116. The pulse output from write command unit 104 and the pulse output from a flip-flop 118, obtained on a pair of conductors 120, 122, are applied to the input terminals of "and" circuits 114 and 116. Flip-flop 118 is characterized by producing an output on one or the other of the conductors 120, 122 responsive to a signal obtained at its input terminal from the "and" circuit 124. "And" circuit 124 is in turn connected to the buffer register 28 and to the write flip-flop 100.

Assuming that the drum 14 is rotating at its selected speed and that generator 38 is generating sampling pulses at some fixed rate of occurrence, the counter 102 will commence to advance in count in response to the clock pulses. Responsive to the generation of the first sampling pulse at generator 38, single-shot 24 will enable the A/D converter 22 to sample the analog quantity $e_{in}$, and the digital equivalent of the sampled analog quantity will be made available at the buffer register 28. By way of example, assume now that counter 102 has advanced to the count of 523 at the instant that a sampling pulse occurs at stepping sequencer 90 in coincidence with the clock pulse 524. At the prior count of 999 counter 102 has produced a pulse on the conductor 103 and the write flip-flop 100 is in its set condition. The sampling pulse from single-shot 92 will trigger the write flip-flop to its reset condition and cause it to apply a signal to "and" circuit 124. During this interval of time the A/D converter 22 has completed digital conversion of the sampled analog quantity $e_{in}$, sampled by this same said sampling pulse, and the "and" circuit 124 now also has present at its input terminal a signal from the buffer register 28.

In this description flip-flop 118 is considered to be in one condition or "up" when a pulse output is produced on the conductor 120, and to be in another condition or "down" when a pulse output is produced on the conductor 122. If the flip-flop 118 is "up" when "and' circuit 124 produces an output, it is apparent that flip-flop 118 is caused to go "down. Conversely, if flip-flop 118 is "down" when "and" circuit 124 produced an output, it will be caused to go "up." It is important to note that the output from A/D converter 22 is represented as either a pulse or the absence of a pulse and that flip-flop 118 will be triggered from one condition to an opposite condition only when the output from the A/D converter is represented by the presence of a pulse.

The pulse output from write flip-flop 100 is seen to simultaneously activate the write command unit 104. The pulse output from write command unit 104, together with the pulse output from flip-flop 118, are simultaneously applied to the "and" circuits 114 and 116. Then, depending upon whether a pulse appears on the conductor 120 or 122, one or the other of "and" circuits 114, 116 will produce an output to energize one or the other of write coils 106, 108. In this description write coil 106 is considered to produce a polarization of one state in each of the cell positions on the corresponding channel 16; the write coil 108 is considered to produce a polarization of a second or opposite state within each cell.

Continuing now with the previous example where a first sampling pulse occurred at the stepping sequencer 90 in coincidence with the clock pulse 524, and further assuming that all cells in the corresponding channels 16 have been previously polarized to the one state by the energization of the respective write coils 106 through a suitable reset circuit, not shown, it is apparent that the write heads 20 will polarize the cell positions 999 responsive to the presence or absence of a pulse at the output terminal of buffer register 28. If a pulse from buffer register 28 is present at "and" circuit 124, flip-flop 118 is triggered "down" and coil 108 is energized to abruptly reverse the polarization from the one state to the second state intermediate the length of cell 999. At the occurrence of the next subsequent sampling pulse, the count at counter 102 will again be processed relative to the drum cells and, as explained heretofore, the write heads 20 will now write in cell position zero upon occurrence of a pulse on the conductor 103. If the output from buffer register 28 is in the form of a pulse, write coil 106 will be energized to abruptly reverse the polarization from the second state to the one state intermediate the length of cell position zero. If, however, the output from register 28 is in the form of the absence of a pulse, write coil 108 will be re-energized to maintain the polarization of this cell in the second state throughout its length.

Since the count of 999 at counter 102 is continually precessed relative to the drum cell positions upon occurrence of sampling pulses, and since the write heads 20 write only upon occurrence of a precessed count of 999, it is apparent that the sampled analog quantities will be stored serially in the information storing channels irrespective of the time duration between occurrences of individual sampling pulses. Similarly, the data stored serially within the information storing channels is read out serially only upon occurrence of the sampling pulses. The delay resolution, namely, the time duration between writing of the first information character and the reading of this first information character, is, however, determined by the decoding matrix 96.

Decoding matrix 96 may be of any suitable form and be adapted to be triggered by the clock pulses being impressed upon the counter 102. Suitable switch means, not shown, adapted to select any count from zero to $2^n-1$ are provided at the matrix 96. At a selected count the matrix is adapted to produce an output for application to read flip-flop 98. The pulse output shown to be applied to matrix 96 by single-shot 94 serves to energize a suitable circuit which synchronizes the matrix pulse output with the clock pulses.

The pulse output from matrix 96 and the delayed sampling pulse output from single-shot 92 are applied to a read flip-flop 98 which may be similar in form to the write flip-flop 100. Read flip-flop 98 is triggered to a set condition by the delayed sampling pulse and triggered to a reset condition by a pulse output from the matrix 96. A pulse output from the flip-flop 98, produced upon being triggered from the set to the reset condition, is applied to a digital-to-analog (D/A) command single-shot 126 and to a register transfer 128.

Since read heads 20 are adapted for continuously reading their corresponding information storing channels 16, it becomes apparent that this information is continuously available at the input terminals of buffer register 32. The delayed sampling pulses prevent undue operation of the buffer register 32 and to this end, the single-shot 92 is shown to be directly connected to the buffer register 32. The sampling pulses applied to buffer register 32 enable or open a suitable input gate, not shown, for the duration of one drum revolution. Upon occurrence of some subsequent clock pulse during this drum revolution, a pulse is obtained at the register transfer 128. Register transfer 128 may also comprise a suitable gate circuit, not shown, for connecting the buffer register 32 to the D/A converter 34 for the duration of one clock pulse.

The information character thus applied to D/A converter 34 is converting to an analog quantity in a manner well known. The pulse output from D/A command single-shot 126 opens a suitable gate within the D/A converter 34 and enables it to apply an output quantity to the amplifier 36. The D/A command single-shot 126 is adapted for suitably delaying the pulse output from flip-flop 98 by a period of time selected to correspond to the duration of time required for D/A converter 34 to complete analog conversion of the input digital quantity. Thus, the analog output from D/A converter 34 is applied to amplifier 36 only after completion of the D/A conversion.

In order to illustrate the reading operation, assume now that the delay resolution obtained at the matrix 96 is set to 20, namely, the switching means associated with the matrix 96 is set to produce an output at the count of 980. Although delay resolution is hereinafter referred to in terms of clock or sampling pulses, it is to be understood that the matrix may be set to correspond to a suitable time base determined by the drum speed and the clock and sampling pulse rates. At the first matrix count of 980, prior to the occurrence of a sampling pulse, it is seen that the flip-flop 98 is triggered to a reset condition by this count. The flip-flop 98 applies an output pulse to register transfer 128 and to D/A command single-shot 126. After an appropriate duration of time the buffer register 32 is connected to the D/A converter 34 for the duration of one clock pulse and the converter output is applied to amplifier 36. The input gate to buffer register 32 has not been opened because of the absence of a sampling pulse and consequently there is no transfer of useful data from the buffer register 32 to the amplifier 36.

Upon occurrence of the first sampling pulse, the read flip-flop 98 is triggered to a set condition and the buffer register input gate is opened or enabled for one drum revolution. Assuming again that the first sampling pulse occurrence is in synchronism or coincidence with clock pulse 26, this pulse will be inhibited by stepping sequencer 90 and the count at counter 102 and matrix 96 will be precessed by a count of one relative to the drum cell positions. The decoding matrix output pulse at the count of 980, therefore, corresponds to cell position 981, and the register transfer 128 will allow the information corresponding to this cell position to be applied from the buffer register 32 to the D/A converter 34. As was previously explained, this sampling pulse also initiates writing of an information character in the cell position zero. For purposes of this description, the information character read from cell position 981 may be considered to be useless information.

The next subsequent 18 sampling pulses each energize a write operation and information characters are written into the cell positions one through 18. Furthermore, these same said 18 subsequent sampling pulses allow the information characters written in cell positions 982 through 999 to be impressed upon the D/A converter 34. Again, for purposes of this description, the information read from these 18 cell positions may be considered to be useless information. Upon occurrence of the 20th sampling pulse, the count of 999 at counter 102 is seen to correspond to drum cell position 19 and the count of 980 at matrix 96 is seen to correspond to cell position zero. The information character recorded within this cell position is seen to correspond to the analog quantity sample corresponding to the first sampling pulse. This information character in the manner explained is now applied to the output terminal 12. Thereafter, the previously recorded information characters are read out serially in response to each subsequent sampling pulse.

Suitable control circuit means, not shown, may be provided to operate in conjunction with a fiducal track on the drum 14 to realign the drum cell positions 1 with the clock track cell position 1 prior to the commencement of a new operation.

While the present serial analog storage device has been described specifically for delaying and storing transmitted analog quantities, it will be apparent to those skilled in the art that it may find utility in delaying and storing transmitted digital quantities as well. Moreover, although the square wave generator according to the present invention has been described as having particular utility for initiating the sampling of an analog quantity, it will be apparent to those skilled in the art that its usefulness is not limited to this particular application.

While only one embodiment of this invention has been shown and described herein and inasmuch as this invention is subject to many variations, modifications and reversals of parts, it is intended that all matter contained in the above description shall be illustrative and not in a limiting sense.

We claim:

1. In a system for delaying the transmission of an analog quantity by predetermined amounts, the combination comprising a magnetic drum rotated at a constant speed and including a plurality of information storing channels and a control channel for storing $n$ signals serially, a unitary control head fixedly associated with each of said channels and including a write portion for writing information into said channels and a read portion for reading information out of said channels, means for periodically sampling the analog quantity and for converting same to equivalent digital quantities for application to the write portions of said unitary control heads associated with said storing channels, means for generating sampling signals to control the periodic sampling of the analog quantity by said sampling means, means connected to the read portion of the control heads associated with said storing channels for converting the digital quantities read therefrom to equivalent analog quantities, and means connected to receive signals from said control head associated with said control channel and to receive signals from said generating means to control the write and read portions of said control heads associated with said storing channels, said write and read portions associated with said storing channels being rendered active only by a particular of the $n$ signals from said control channel and the occurrence of said particular signal being continuously altered by each sampling signal whereby the sampled signals are recorded on and read from said drum information storing channels sequentially.

2. In a system for delaying the transmission of an analog quantity, the combination comprising a cyclically moving information storage medium including a plurality of parallel information storing channels, each said channels including $n$ cell positions, a timing channel generating a timing signal corresponding to each of said $n$ cell positions, means generating periodic sampling signals, means sampling the analog quantity in response to said sampling signals, means for recording the sampled quantities sequentially in said cell positions in response to said sampling signals and said timing signals, means reading the signals from said storing channels, means generating an instruction signal in response to a particular one of said timing signals for enabling said reading means, and means connected to said sampling signal means for varying the occurrence of said particular timing signal relative to the corresponding one of said $n$ cell positions whereby the sampled quantities are read sequentially in the order of recordation after a preselected time delay.

3. In a system for delaying the transmission of an analog quantity by predetermined amounts according to claim 2, wherein said control channel reading means generates one instruction signal for each $n$ timing signals, and said varying means precesses the occurrence of the instruction signal by one cell position upon occurrence of a sampling signal.

4. In a system for delaying the transmission of an analog quantity by predetermined amounts, the combination comprising a magnetic drum rotated cyclically at a constant speed and including a plurality of information storing channels, each said channel including a plurality of cell positions, a timing channel for generating a timing signal corresponding to each said cell position, a unitary control head associated with each of said channels and including a write portion for writing information into said channels and a read portion for reading information out of said channels, means for periodically sampling the analog quantity and for converting same to equivalent digital quantities, means generating sampling signals to control the periodic sampling of the analog quantity by said sampling means, means responsive to the sampling signals and to the timing signals for applying the digital output from said converting means to the write portions of said unitary control heads associated with said storing channels for storing successively sampled quantities in successive of said cell positions, means connected to the read portions of said control heads associated with said storing channels for converting the digital quantities read therefrom to equivalent analog quantities, and means connected to said converting means and controlling its operation in response to said timing signals and said sampling signals, whereby the stored signals are read out sequentially in the order of their recordation.

5. In a system for delaying the transmission of an analog quantity, the combination comprising an information storage medium including $n$ cell positions, means generating a timing pulse corresponding to each said $n$ cell position, means generating sampling signals, means sampling the analog quantity in response to said sampling signals and converting same to a digital quantity means for writing the sampled digital quantity in a selected one of said $n$ cell positions, means for reading the digital quantities from a selected one of said $n$ cell positions and converting same to an analog form, a continuously cycling counter adapted for counting to $n$ in response to said timing pulses, means enabling said writing means in response to occurrence of a sampling signal and a particular count at said counter, means enabling said reading means in response to occurrence of said sampling pulses and another particular count at said counter, and means connected to said counter and to said timing means for inhibiting a timing pulse each time that a sampling signal occurs, thereby to precess the count at said counter relative to said $n$ cell positions and cause sequential reading of and writing in said $n$ cell positions.

6. In a system for delaying the transmission of an analog quantity, the combination comprising a magnetic drum including plural information storing channels and a timing channel, each said channel having $n$ cell positions, said timing channel generating a timing signal corresponding to each cell position, a read and a write head corresponding to each of said channels, means including an analog-to-digital converter for periodically sampling the analog quantity, means generating a sampling signal for activating said sampling means, a counter connected to said timing channel and continuously counting to $n$ in response to said timing signals, means including a first flip-flop circuit which is enabled by a sampling pulse and triggered by a particular count at said counter for applying the digital output from said converter to said storing channel write heads, means including a digital-to-analog converter, means including a second flip-flop circuit which is enabled by a sampling pulse and triggered by another particular count at said counter for applying to said digital-to-analog converter the information read by said storing channel read heads, and means connected to said counter and to said sampling signal generating means for precessing the count at said counter relative to said timing signals upon occurrence of a sampling signal, whereby said sampled signals are sequentially recorded in said $n$ cell positions and sequentially read in the order of their recordation.

7. In a system for delaying the transmission of an analog quantity, the combination comprising
- a storage medium with cyclically moving channels of data and control information including $n$ cell positions of data and control storage,
- means producing control signals corresponding to data information stored in cell positions,
- means generating periodic sampling signals,
- means sampling the analog quantity in response to said sampling signals,
- means for recording the sampled quantities in said cell positions in response to said sampling signals and said control signals,
- means for reading the signals from said channels,
- means generating an instruction signal in response to a particular one of said control signals for enabling said reading means, and
- means connected to said sampling signal means for varying the occurrence of said control signals whereby the sampled signals are read out.

8. In a system for delaying the transmission of an analog quantity, the combination comprising
- a storage medium with cyclically moving channels of data and control information including $n$ cell positions of data and control storage,
- means producing control signals corresponding to data information stored in cell positions,
- means generating periodic sampling signals,
- means sampling the analog quantity in response to said sampling signals,
- means for recording the sampled quantities sequentially in said cell positions in response to said sampling signals and said control signals,
- means for reading the signals from said channels,
- means generating an instruction signal in response to a particular one of said control signals for enabling said reading means, and
- means connected to said sampling signal means for varying the occurrence of said control signals whereby the sampled signals are read out sequentially after a preselected timing delay.

References Cited by the Examiner

UNITED STATES PATENTS

| | | | |
|---|---|---|---|
| 2,485,821 | 10/1949 | Gloess et al. | 340—347 X |
| 2,817,704 | 12/1957 | Huntley | 340—347.1 |
| 2,922,990 | 1/1960 | Anderson | 340—174 |
| 2,933,254 | 4/1960 | Goldberg et al. | 235—197 |
| 2,942,198 | 6/1960 | Kalfaian | 328—185 |
| 2,946,044 | 7/1960 | Bolgiano et al. | 340—347 X |
| 2,947,976 | 8/1960 | Mendelson et al. | 340—172.5 |
| 2,987,704 | 6/1961 | Gimpel et al. | 340—172.5 |
| 3,018,052 | 1/1962 | Fogarty | 235—197 |
| 3,025,000 | 3/1962 | Taback | 235—197 |
| 3,094,609 | 6/1963 | Weiss | 235—157 |

ROBERT C. BAILEY, *Primary Examiner.*

EVERETT R. REYNOLDS, MALCOLM A. MORRISON, *Examiners.*